United States Patent
Fenini et al.

(10) Patent No.: US 11,267,542 B2
(45) Date of Patent: Mar. 8, 2022

(54) ON-BOARD FABRICATION OF PIPE-IN-PIPE ASSEMBLIES

(71) Applicant: Shanghai Zhenhua Heavy Industries Co., Ltd., Shanghai (CN)

(72) Inventors: Alessandro Fenini, Sharjah (AE); Laurent Daney, Sharjah (AE)

(73) Assignee: Shanghai Zhenhua Heavy Industries Co., Ltd., Shanghai (CN)

( * ) Notice: Subject to any disclaimer, the term of this patent is extended or adjusted under 35 U.S.C. 154(b) by 0 days.

(21) Appl. No.: 16/772,411

(22) PCT Filed: Dec. 10, 2018

(86) PCT No.: PCT/EP2018/084126
§ 371 (c)(1),
(2) Date: Jun. 12, 2020

(87) PCT Pub. No.: WO2019/115438
PCT Pub. Date: Jun. 20, 2019

(65) Prior Publication Data
US 2021/0078679 A1 Mar. 18, 2021

(30) Foreign Application Priority Data
Dec. 12, 2017 (GB) .................................. 1720673

(51) Int. Cl.
*B63B 35/03* (2006.01)
*F16L 1/19* (2006.01)
(Continued)

(52) U.S. Cl.
CPC ................ *B63B 35/03* (2013.01); *F16L 1/19* (2013.01); *B63B 2003/147* (2013.01); *F16L 1/225* (2013.01); *F16L 1/23* (2013.01)

(58) Field of Classification Search
CPC .. B63B 35/03; F16L 1/207; F16L 1/23; F16L 1/19; F16L 1/206; F16L 1/225; F16L 9/18; F16L 39/005
See application file for complete search history.

(56) References Cited

U.S. PATENT DOCUMENTS 6,328,502 B1 * 12/2001 Hickey ................... B63B 35/03
405/168.3
8,956,079 B2 * 2/2015 Roodenburg ............. F16L 1/19
405/169
(Continued)

FOREIGN PATENT DOCUMENTS

GB 2394522 A 4/2004
WO 9635902 A1 11/1996
(Continued)

OTHER PUBLICATIONS

International Search Report issued in International Application No. PCT/EP2018/084126 dated Apr. 12, 2019 (6 pages).
(Continued)

*Primary Examiner* — Carib A Oquendo
(74) *Attorney, Agent, or Firm* — Osha Bergman Watanabe & Burton LLP (57) ABSTRACT

A pipelay vessel having two pipe string manufacturing lines and a firing line, wherein the pipe string manufacturing lines are designed for simultaneously handling two different pipe outer diameters for use as an inner pipe and an outer pipe respectively. Further, the vessel has a pipe-in-pipe assembly workstation for assembling the inner pipe and the outer pipe in a pipe-in-pipe configuration. The vessel is designed with a lay-out which allows for producing offshore pipe-in-pipe strings from single joints, wherein available space is optimally used and pipe-in-pipe strings can be produced safely offshore.

18 Claims, 9 Drawing Sheets

(51) Int. Cl.
*B63B 3/14* (2006.01)
*F16L 1/225* (2006.01)
*F16L 1/23* (2006.01)

(56) References Cited

U.S. PATENT DOCUMENTS

| | | | |
|---|---|---|---|
| 2010/0104371 A1* | 4/2010 | Scaini | F16L 1/207 |
| | | | 405/166 |
| 2014/0116556 A1* | 5/2014 | Critsinelis | F16L 9/20 |
| | | | 138/97 |
| 2015/0159775 A1 | 6/2015 | Bonigen et al. | |
| 2020/0378171 A1* | 12/2020 | Reiter | E05D 15/32 |

FOREIGN PATENT DOCUMENTS

| | | |
|---|---|---|
| WO | 2008053251 A2 | 5/2008 |
| WO | 2011037459 A1 | 3/2011 |

OTHER PUBLICATIONS

Written Opinion issued in International Application No. PCT/EP2018/084126 dated Apr. 12, 2019 (10 pages).

* cited by examiner

ON-BOARD FABRICATION OF PIPE-IN-PIPE ASSEMBLIES

FIELD OF THE INVENTION

The present invention relates to a vessel designed for on-board fabrication of single-joint pipes into an assembly forming a string of rigid pipe-in-pipe and a production method for such pipe-in-pipe. Further, the invention relates to a workstation for assembling pipe-in-pipe strings.

BACKGROUND ART

Subsea pipe-lay vessels are generally known in various configurations, whereby J-lay and S-lay are most commonly used for installation of rigid flowlines. S-lay is generally used for pipeline installation in shallower water depths and J-lay for deep water. Offshore oil fields are found and developed globally, at various depths and with depth changes for planed pipeline routes. Advantageously, a vessel capable of both lay methods can thus be used for all offshore rigid pipeline installation.

Due to the fact that these vessels are floating, 24/7 operational factories, with 200-500 skilled personnel on board, the cost of operating pipe-lay vessels is very high. As a result, operators constantly aim to optimize and thereby minimize the amount of time spent by a pipe-lay vessel to install offshore oil field developments.

Regular pipelines are constructed by welding together so called single joints, which are pipes of about 12 m length, to the final required pipeline length in the oil field. This is normally done in steps, whereby single joints are first welded into double-joint strings (24 m), triple-joint strings (36 m) and/or quad-joint strings (48 m), prior to being welded onto a pipeline hanging of the pipe-lay vessel which is installing the pipeline in-situ offshore. By using these intermediate string lengths an optimum is created between minimizing the amount of "critical time" spent on in-situ manufacturing for creating the required pipeline length and maintaining relatively easy to handle prefabricated strings. This critical time determines the amount of time the pipe-lay vessel spends working on installing the pipeline and generally largely determines the cost of a subsea pipe-lay project.

Depending on offshore oil field properties, highly insulated production pipelines may be required for transporting the oil from the field. This may be particularly relevant for deep water and extremely deep water operation where seabed temperatures can cause solidification of the pipeline contents. Normally, a "wet insulation" is applied to pipelines, providing insulation. Wet insulation covers a range of insulating coating materials, including foamed and syntactic PU, PP and silicone materials, which are applied to the outside of the pipeline and thus will be in direct contact with seawater. These pipes arrive pre-coated at the vessel, where, after welding, only a small section of coating called field joint coating needs to be installed over the welded sections. The offshore pipeline manufacturing time is thus determined by the pipe handling, welding and field joint coating operations.

Where even better insulation properties are required, "dry insulation" material is applied, such as Aerogel, Izoflex or Rockwool. The insulating properties of these materials are known to decrease rapidly once the materials become saturated with a liquid, thus dry insulated pipelines must be constructed such that the insulation remains dry at all times. This is generally obtained by constructing the pipelines as pipe-in-pipe (PiP) pipelines, whereby the line comprises inner and outer pipes with the dry insulation material sandwiched there between. The PiP can be constructed as sliding, swaged or fixed PiP, which are well-known types of PiP. Vacuum can also be applied to the space between the inner and outer pipes to further enhance the insulation.

Due to the double amount of pipes present in PiP, production of such pipe strings involves more than double the amount of fabrication steps as well as increased pipe handling and the use of special equipment. Thus manufacturing of PiP generally requires more space and more time. In offshore situations, the available space for these required operations is limited. To ensure fabrication offshore is performed as safely as possible and to limit offshore fabrication time, for pipe-lay projects with PiP to date, part of string production is performed in onshore yards. At the onshore yards the PiP double-, triple- and/or quad-joints are then manufactured and shipped to the pipe-lay vessel at call-off using barges.

A downside of this method is that the transport of pipe strings comes with associated transport damage risks. Additionally, it requires extensive coordination and project management to ensure the prefabrication schedule ties in with transport and offshore production/installation schedules. With pipe-lay projects around the world, either very long distance shipping has to be dealt with or yards are required globally to minimize the shipping distance of the PiP strings, coming at a cost of having many yards fully outfitted for PiP string production or with constant relocation costs. The coordination of transport of pipe strings is even more difficult for the extreme frontiers area, where regular barges cannot be used for transport during most of the year, due to ice.

It would be desirable to enable production of offshore pipe-in-pipe pipelines at reduced operational coordination and costs.

SUMMARY OF THE INVENTION

According to the present invention, a pipelay vessel as defined above is provided, in which two pipe string manufacturing lines and a firing line are set up, wherein the pipe string manufacturing lines are designed for simultaneously handling two different pipe outer diameters for use as an inner pipe and an outer pipe respectively. Additionally the vessel has a pipe-in-pipe assembly workstation for assembling the inner pipe and the outer pipe in a pipe-in-pipe configuration. The vessel is designed with a lay-out which allows for producing offshore pipe-in-pipe strings from single joints, wherein available space is optimally used and pipe-in-pipe strings can be produced safely. No onshore facilities or transport of pipe-in-pipe strings to the vessel is required, thus the use of onshore pipe-in-pipe string assembly facilities is not required when using a pipelay vessel according to the invention. As a result, the operational coordination is reduced and overall offshore pipelay project costs may be reduced. Furthermore, such a vessel may be operated in the extreme frontiers, enabling pipe-in-pipe pipelay projects in such difficult to reach areas.

The vessel is set up to produce at least one of sliding, swaged or fixed pipe-in-pipe pipelines. The pipe string manufacturing lines of the vessel can be operated separately and independent from each other, allowing inner and outer pipe strings to be produced at a speed which matches the speed at which the pipe-in-pipe assembly workstation can be operated.

The pipe string manufacturing lines comprises one or more workstations for the fabrication of multi-length strings from single joints. Each workstation is dedicated to part of the fabrication process and contains dedicated equipment, further contributing to limiting required movement of pipe, equipment and personnel during PiP string production. The limited movements of pipe equipment and personnel lead to increased safety. Furthermore, by limiting these movements, the amount of space dedicated to movements can also be reduced, resulting in a relative compact design of the manufacturing lines. Additionally, the dedicated workstations on the manufacturing lines allow for simultaneous operations to occur in line, and can be set up such that they have limited to no impact on overall fabrication speed of the pipe-in-pipe pipeline.

Both pipe string manufacturing lines may include a first workstation for the assembly of single-joints into double-joints, a second workstation for the assembly of double-joints into triple- or quad-joints and a third workstation for pipe string pipe end outfitting.

Both first and second workstations have equipment for pipe end preparation, welding and weld inspection. Generally the outer pipe and inner pipe single-joints have been pre-coated onshore, resulting in both pipe strings only requiring field joint coating being applied over the welded areas offshore. Thus at least one workstation of each manufacturing line also has field joint coating equipment present.

Furthermore, (dry) thermal insulation, and depending on the type of pipe-in-pipe manufactured, several inner pipe centralizers and/or waterstops are installed on the inner pipe-in-pipe strings in a workstation, prior to reaching the pipe-in-pipe assembly workstation. If required, vacuum may be applied.

Following the pipe-in-pipe assembly workstation, a fourth type workstation is present for installing any external items such as VIV streaks, buckle arrestors, anodes and/or specific forged pipeline components to the outer pipe. Furthermore, in this workstation fixing clamps are installed on the assembly for locking the inner pipe against the outer pipe, to prevent it from sliding out during further handling and pipeline manufacturing operations.

All the workstations are linked with a process reporting system to assure production efficiency, quality and safety.

The pipe-in-pipe assembly station is configured for the assembly of pipe-in-pipe lengths with a string length ranging between one and up to four standard joint lengths. The string length can be varied, and for example chosen such that the overall fabrication speed of the manufacturing lines matches the speed at which the firing line is operated. Other project demands such as pipelay method may also dictate the string length produced in the pipe-in-pipe assembly station for delivery to the firing line. Assembly of quad-joint strings in the assembly station results in only having to perform joining operations on the firing line once every four pipe lengths, allowing the firing line to be operated at high speed. However, depending on the amount of preparatory works to be performed on the inner and outer pipe strings prior to assembly, the firing line may not be operated at a constant speed if the manufacturing lines and assembly workstation cannot operate at the same speed. Thus if project demands a relatively high amount of preparatory works to be done on the inner and outer pipe strings, a more constant operational speed of the firing line can be reached when double-joint pipe-in-pipe strings are delivered by the pipe-in-pipe assembly station.

The pipelay vessel may have a weather deck, and arranged thereon a J-lay pipe deployment facility comprising a tower, for deployment of pipe in J-lay mode which is received from the firing line. Additionally, this vessel will have pipe handling equipment for delivering the pipe or pipe-in-pipe strings from the firing line to the tower. The J-lay tower may be arranged to lay pipe off a side of the vessel, but according to a preferred embodiment, the vessel has a moonpool, passing through the weather deck, with the J-lay tower located above the moonpool. In this configuration, the vessel deploys pipe in the J-lay mode through the vessel via the moonpool. The moonpool is preferably of rectangular shape and large enough to allow passage of in-line and pipe end structures, which are to be connected to and installed as part of the pipeline. Advantage of having this configuration is that the pipelay vessel may be a relatively compact ship-shaped vessel with good stability, allowing the vessel to have a high transit speed.

The manufacturing lines can be arranged either on or below the weather deck. In a preferred embodiment, the vessel is arranged with the pipe string manufacturing lines below the weather deck. Such arrangement allows for optimal use of vessel space, whereby the weather deck remains largely available for other activities. Furthermore, by having the manufacturing lines below the weather deck, manufacturing operations are automatically shielded from weather conditions allowing the manufacturing environment to be more controllable. A more controllable manufacturing environment allows for more consistency in the manufacturing quality of the pipe strings produced onboard. Additionally, depending on the respective locations of the manufacturing lines in respect to the firing line and the J-lay tower, the pipe handling equipment may need to comprise elevators for lifting pipe strings to the weather deck. Here the pipe-in-pipe strings will be lifted into the vertical J-lay tower, where they will be welded onto the section of pipeline hanging off the vessel.

In a further embodiment, the vessel also has storage space for single pipe joints. Storage of single pipe joints could both be realised inside the hull of the pipelay vessel or on the weather deck. Having onboard storage allows the pipelay vessel to be operated independently, limiting or even eliminating the use of supply barges during pipelay projects. As a result, project costs and coordination of additional transport are reduced. This is especially advantageous pipelay projects in areas which are difficult to reach, making such projects easier to manage and cheaper.

Additionally, the vessel may further have on-board storage for the fabricated pipe-in-pipe strings. Having such storage capacity allows for storing pipe-in-pipe strings which cannot yet be handled by the firing line for final assembly and installation. Furthermore, having onboard storage for pipe-in-pipe strings allows the vessel to be used for prefabrication of strings when not (yet) at the offshore pipeline installation location. Thus transit time of the vessel may be utilised as manufacturing time, further optimising vessel time.

In another preferred embodiment, the vessel further has an S-lay pipe deployment facility located below the weather deck, comprising the firing line. This vessel is advantageously suitable for both deep and shallow water rigid pipe lay. To allow optimal use of the vessel, the J-lay tower is preferably arranged for performing operations through the moonpool simultaneously with operation of the S-lay pipe deployment facility to manufacture the pipeline. Such arrangement allows the S-lay pipe deployment facility to be operated as part of the J-lay manufacturing line, making optimal use of onboard space and equipment.

In a further preferred embodiment, the firing line extends along a centreline of the vessel and the moonpool is located to one side of the firing line. With this configuration the previously discussed simultaneous operation of the moonpool and the S-lay pipe deployment facility is enabled, while the vessel motions have limited effect on the pipeline extending from the vessel when in S-lay mode.

Additionally, the moonpool may be separated from the firing line by a cofferdam extending to the weather deck. The cofferdam ensures J-lay deployment operations can only be performed from the weather deck and protects the workstations in the hull of the vessel from the operations and influence of the elements onto operations. Thus having a cofferdam provides safety and a stable work environment inside the hull of the vessel. The stable work environment enables a constant quality of the welding and coating operations on the manufacturing lines and firing line.

The S-lay firing line may comprise one of the workstations. Having such configuration further optimises onboard space and equipment and allows the vessel design to be of regular pipe-lay vessel size. The total length of the pipelay vessel may be 200 to 225 meters.

In an embodiment the pipe-in-pipe assembly station is arranged to assemble inner and outer pipe strings on the firing line. The assembly station comprises both the firing line and an insertion tool parallel and directly next to the firing line. In this configuration, the firing line is used to line up the inner and outer pipes and supply inner pipes with insulation and centralisers and waterstops if required. Thus large pipe moments are limited and optimal use is made of equipment already present. In J-lay mode the pipe-in-pipe strings produced on the firing line are subsequently lifted to the weather deck for loading into the J-lay tower. Quad joint pipe-in-pipe strings will generally be preferred in J-lay mode as they will result in the highest pipelay speed in this mode. When operated in S-lay mode, the firing line is also required for welding the pipe-in-pipe strings onto the pipeline, which is subsequently to be deployed directly from the back of the firing line into the sea. A first option of operation in S-lay mode is to produce (quad-joint) pipe-in-pipe strings in advance on the firing line and store them on the vessel prior to starting in pipe-lay mode.

A second option is to produce the pipe-in-pipe strings in shorter lengths, such as double-joint lengths, thereby leaving sufficient space on the firing line for welding pipe strings onto the pipeline. In this alternative, the pipe-in-pipe assembly station is arranged parallel and adjacent to the firing line, such that a distance between the firing line and the pipe-in-pipe assembly station is less than 5 meters, allowing pipe-in-pipe strings being produced during S-lay pipelay mode. The pipe-in-pipe insertion tool may be positioned next to the double-joint workstations at the starting end of the firing line and perform the assembly of the double-joint strings in parallel to the pipe-in-pipe double-joint strings fabrication activities. Double-joint pipe-in-pipe strings are then introduced to the firing line where they are welded to the pipeline and deployed in S-lay mode.

Furthermore, the pipe handling equipment may comprise an elevator arranged to elevate pipe-in-pipe strings between the firing line and the weather deck. Having dedicated elevators as part of the pipe handling equipment offers a safe and reliable means of transport for the pipe-in-pipe strings, which are manufactured below the weather deck and either to be installed using the J-lay tower on the weather deck or to be stored there. These dedicated elevators may be located on or near the firing line of the S-lay deployment equipment.

Additionally, the present invention is related to a method of laying a pipe-in-pipe pipeline from a pipe-laying vessel, which has two independent and separate pipe string manufacturing lines, a firing line and a J-lay tower. The method comprises deploying pipe from the vessel in J-lay mode by first introducing single pipe in a first workstation of each of the two pipe string manufacturing lines, whereby the first pipe string manufacturing line receives inner pipes and the second pipe string manufacturing line receives outer pipes, the inner pipes having a smaller outer diameter than the inner diameter of the outer pipes. Subsequently, double-joints are fabricated in a first type workstation of each pipe string manufacturing line. Then the double-joints are introduced into the firing line, where the doubles are joined to form quad- or triple-joint pipe strings. Next, the inner pipe and the outer pipe strings are assembled in a pipe-in-pipe configuration, after which the pipe-in-pipe configuration is presented to the J-lay tower. Finally, the pipe-in-pipe configuration is connected to the pipeline and lowered into the sea.

The vessel may be a vessel according to the present invention and the step of assembling the inner and outer pipe strings into a pipe-in-pipe configuration may at least in part be performed on the firing line. Further optimizing the lay-out and use of onboard space, all pipe string manufacturing steps up to and including the assembly of inner and outer pipe strings to form the pipe-in-pipe configuration may be performed below a weather deck, while the J-lay tower is located on the weather deck. In such a configuration, the pipelay method step of presenting the pipe-in-pipe configuration to the J-lay tower further comprises elevating the pipe-in-pipe configuration to the weather deck.

Finally, the present invention relates to a pipe-in-pipe assembly workstation for assembling inner and outer pipe strings in a pipe-in-pipe configuration, comprising multiple pipe line-up conveyor modules positioned for supporting an inner pipe string and an outer pipe string such that their centre lines form one continuous line, and a pipe push-pull system arranged to move the outer pipe string with respect to the inner pipe string. Prior to assembly the inner and outer pipe strings are lined up such that their centrelines share a single axis. The assembly is then initiated by tensioning the inner pipe string, using the push-pull system, after which the conveyor rollers transport the outer pipe string over the inner pipe string in a controlled manner. Hereby the conveyor modules are set up to optimize the inner to outer pipe string offset during insertion. The conveyor modules may provide compensation of out-of-roundness and non-straightness of pipes to ensure smooth insertion of inner pipe string into outer pipe string. Automation of the pipe-in-pipe assembly results in good consistent quality of pipe-in-pipe strings, whereby the smooth insertion limits the amount of human intervention required to make corrections and limits downtime of the workstation. Furthermore, the set-up of the workstation allows full control of all assembly motions, allowing the assembly station to be safely used in the offshore environment.

The pipe-in-pipe assembly workstation may comprise one or more line-up conveyor modules having a set of support rollers placed in a V-configuration, for supporting the outer pipe string and allowing a translational movement of the pipe along the centreline. Additionally, one or more pipe line-up conveyor modules may have a set of motorized rollers, for transporting the outer pipe over the inner pipe to assemble the pipes to the pipe-in-pipe configuration. Also, one or more pipe line-up conveyor modules may further have at least one spinning roller for supporting and rotating the inner pipe during insertion into the outer pipe. The conveyor modules enable insertion with a tolerance of maximum five millimetres between the centralizer outer circumference and the outer pipe inner circumference Multiple conveyor modules are set up along the length of the assembly workstation, to optimize the inner to outer string offset during insertion. To support a quad-joint inner pipe string, a minimum of four line-up modules are required.

According to an embodiment, the pipe push-pull system has a pipe end pusher, located at one end of the pipe-in-pipe assembly workstation, for pushing of the inner pipe string during pipe-in-pipe assembly. Additionally, the pipe push-pull system may have a double plug system for pulling an inner pipe string in both directions, comprising an inner pipe end cap, located on a first end of the workstation for connecting to a far end of the inner pipe string, and an outer pipe end cap, located at an opposite side of the workstation, for connecting to a far end of the outer pipe string. The double plug system may further comprises an inner interconnection cable, connectable to the inward facing sides of the inner pipe end cap and the outer pipe end cap, through the pipe strings. The pipe push-pull system may also have an inner pipe winch, located on the pipe pusher and connectable to the outward facing side of the inner pipe end cap. Additionally, the pipe push-pull system could have an outer pipe winch, located on the opposite end of the workstation from the pipe pusher, for connecting to the outward facing side of the outer pipe end cap. The winches of the pipe end pusher keep the inner pipe strings under tension during assembly by the rollers, ensuring the pipe strings centrelines remain aligned throughout the assembly procedure and allowing full control of pipe movements. The pipe end pusher is adjustable such that a distance between the pipe pusher and the outer pipe winch can be adjusted over a 4 to 5m distance, for compensating the difference in pipe string length due to pipe length tolerances. Furthermore, the height and the distance from the outer pipe winch of the pipe end pusher may be made adjustable such that the same pipe end pusher can be used for pipes with different outer diameters.

According to an embodiment, the workstation is no longer than 110 m, which is sufficient space for lining up eight 12 meter pipes. Thus the workstation is sufficiently long for assembling two quad—joint strings. This length workstation will fit in most pipe-lay vessels, which commonly have a hull length of around 200 meters at least.

Furthermore, the pipe-in-pipe assembly station may be repositionable. Being repositionable allows the assembly station to be folded below the minimum workstation pipe string elevation such that the equipment does not interfere with other workstation operations or when the workstation is present is located on the firing line, which is in use as S-lay firing line. Alternatively, or additionally the pipe-in-pipe assembly station may have bolted foundations for the conveyor and pusher modules, allowing relocation of the tools to allow set-up of the pipe-in-pipe manufacturing line according to a variety of project requirements. Bolted foundations allow the conveyor and pusher modules to be relocated from the firing line area to a different area such as near the double-joint string manufacturing lines for producing double-joint Pipe-in-Pipe strings.

BRIEF DESCRIPTION OF THE DRAWINGS

The present invention will be discussed in more detail below, with reference to the attached drawings, in which illustrative embodiments thereof are shown. The drawings are intended exclusively for illustrative purposes and not as a restriction of the inventive concept. The scope of the invention is only limited by the definitions presented in the appended claims.

DESCRIPTION OF EMBODIMENTS

Figure 1:
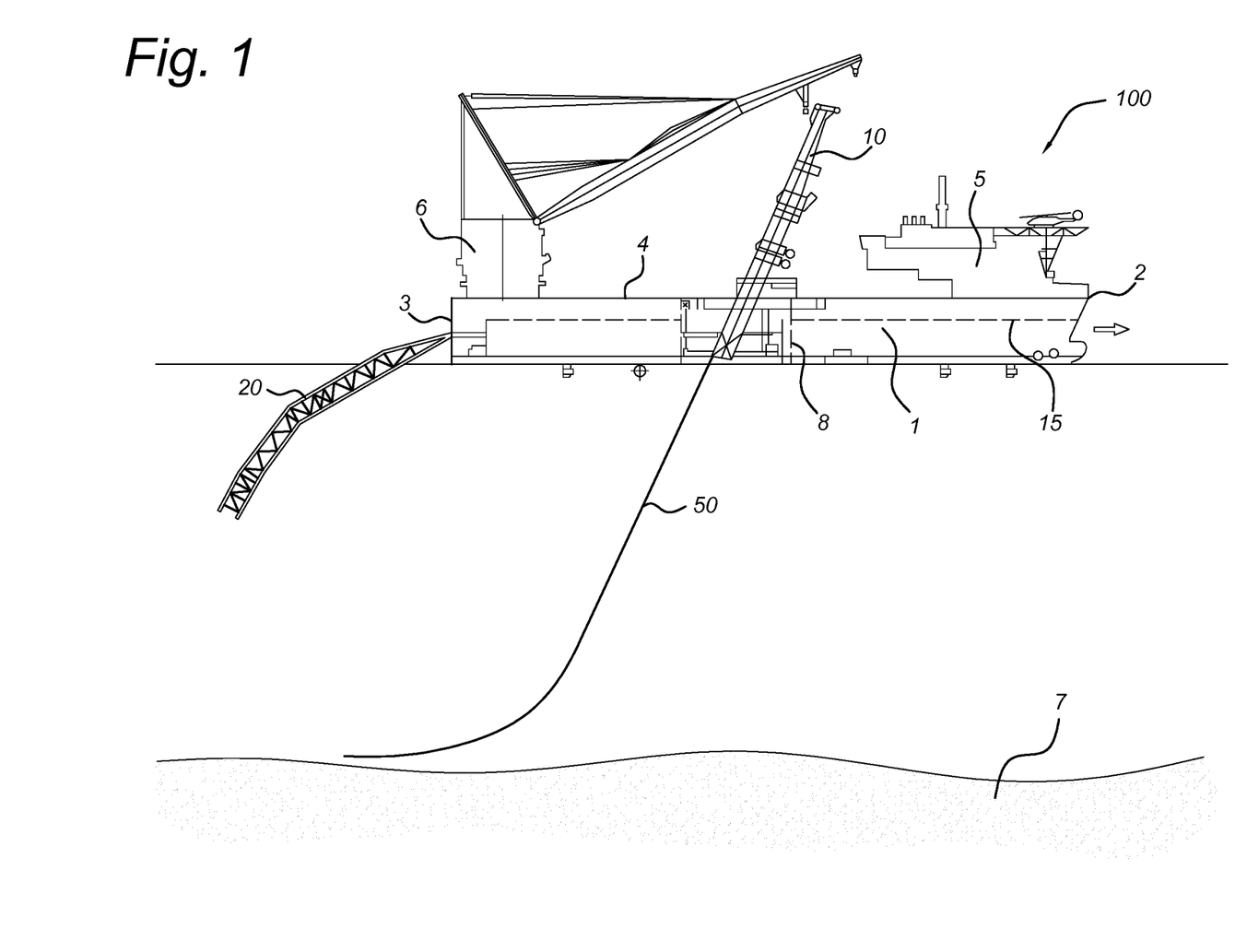
FIG. 1 depicts a pipelay vessel according to an embodiment of the invention.

FIG. 1 depicts a pipelay vessel 100 according to an embodiment of the invention. The vessel 100 comprises a hull 1, accommodation 5, a crane 6, a J-lay-tower 10 and an S-lay stinger 20, whereby the hull 1 has a bow 2, a stern 3 and a weather deck 4. Furthermore, the figure shows a pipeline 50 and the seabed 7. Below the weather deck 4 are further decks including a pipeline manufacturing deck 15. The pipelay vessels hull 1 is defined by the bow 2 at the front, defining the normal sailing direction, the stern 3 at the backside and the weather deck 4 at the top side. Above the weather deck 4, the accommodation 5 and crane 6 are located, as well as the J-lay tower 10. In the configuration shown, the accommodation 5 is located at the bow side, the J-lay tower 10 amidships and the crane 6 at the stern side, such that the crane 6 has full reach over the weather deck 4 and to the J-lay tower 6 without obstructing the view from the accommodation 5. The J-lay tower 10 lowers an on-board manufactured pipeline 50 to the seabed 7 through a moonpool 8 in the hull. Alternatively, the J-lay tower may be located to one side of the weather 4 deck, to allow J-lay pipe-deployment along a side of the vessel. Additionally, the vessel has an S-lay stinger 20 connected to the stern 3 of the hull 1, enabling the vessel to also perform pipelay operations in S-lay mode.

Figure 2:
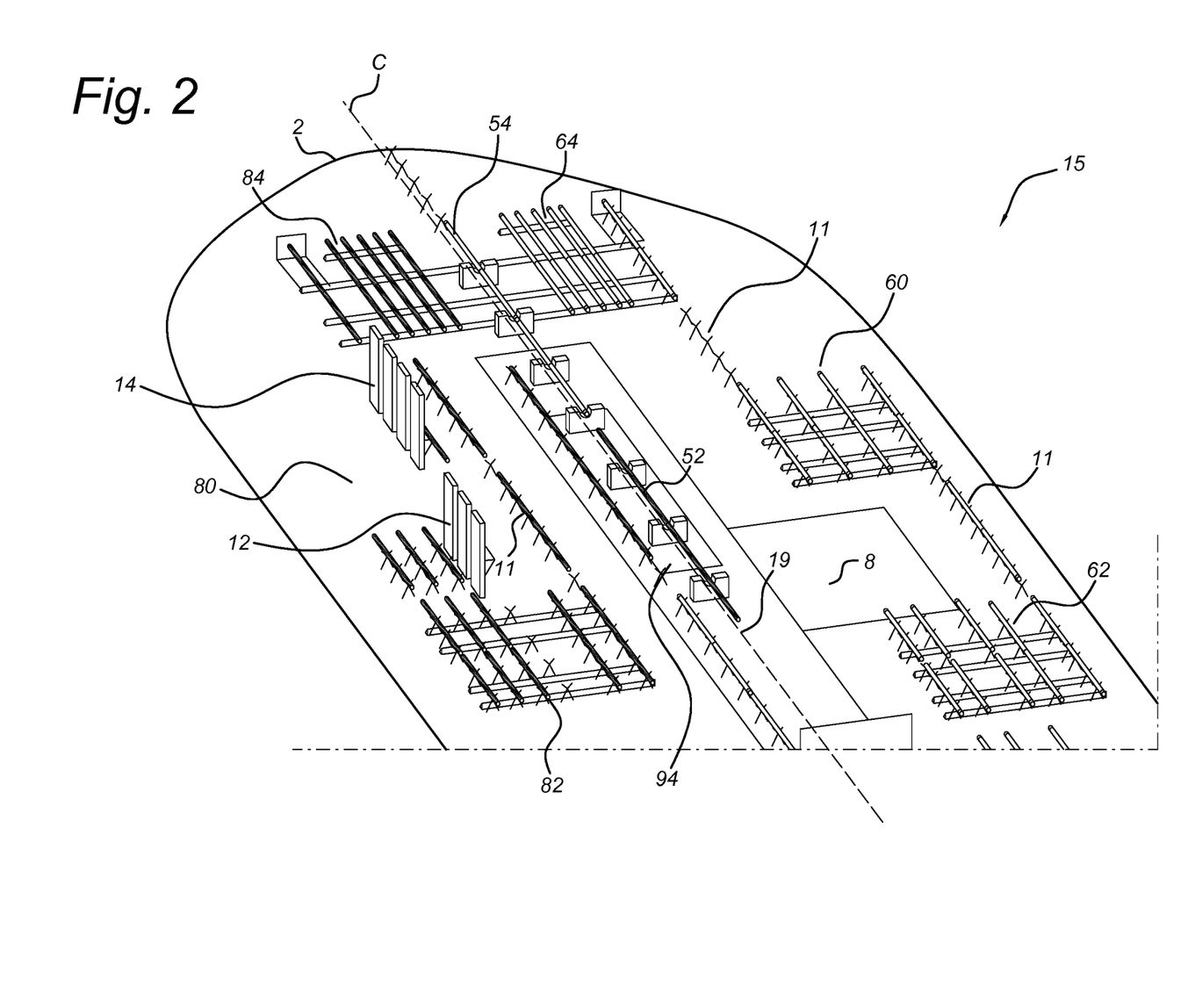
FIG. 2 shows a perspective view of the vessel's pipeline manufacturing lay-out according to an embodiment.

FIG. 2 shows a perspective view of the lay out of the vessel's pipeline manufacturing deck 15 according to an embodiment. The pipeline manufacturing deck 15 comprises a starboard side manufacturing line 60 and a portside manufacturing line 80, a pipe-in-pipe assembly workstation 94 and the firing line 19 (partially shown), as well as pipe handling equipment including conveyors 11 and elevators 12. In the present configuration, the firing line 19 is positioned on the centerline C of the vessel, comprising the pipe-in-pipe assembly workstation, and having one manufacturing line arranged on each side. Thus pipes move from the aft of the vessel towards the bow 2, via the manufacturing lines 60, 80, where they are assembled to pipe-in-pipe configuration in the pipe-in-pipe assembly workstation 94 and travel to the aft of the vessel again, via the firing line 19.

The manufacturing deck 15 is set up for manufacturing pipe strings from single-joints up to a maximum length of four single-joints. In the configuration shown, both manufacturing lines 60, 80 are set up for producing double-joint strings from single-joints, whereby in the present example the starboard side manufacturing line 60 is set-up for manufacturing of the outer pipe strings 54 and the portside manufacturing line for manufacturing of the inner pipe strings 52 for the pipe-in-pipe pipeline. Each pipe string manufacturing line 60, 80 has an area 62, 82 set up for assembly of single joints into double-joints. The pipes and pipe strings are conveyed from work area to work area using conveyors 11 of the on-board pipe handling equipment. Following assembly, the inner and outer pipe double-joint assemblies are collected in the manufacturing lines respective pipe handling racks 84, 64.

Further assembly of the double-joint strings into a quad-joint string, or alternatively a triple-joint string, is performed at the centerline of the vessel, using the firing line equipment. This will be done for both the outer and the inner pipe strings. As shown in FIG. 2, the quad-joint inner string 52 is scheduled to be welded and inspected while the quad-joint outer string 54 is still under assembly, allowing for thermal insulation and other items such as centralizers to be added to the inner pipe string 52 while the outer pipe string 54 is being finalized. The assembly of the inner and outer pipe strings 52, 54 is performed in the off-center pipe-in-pipe insertion tooling of the pipe-in-pipe assembly workstation 94, for which the inner and outer pipe strings 52, 54 are transferred off the firing line into the tooling. The length of the workstation 94 is sufficient for aligning two quad-joint strings in the tooling. Following assembly, the pipe-in-pipe string is transferred back onto the firing line 19 for further handling.

The vessel according to the embodiment depicted in FIG. 2 further comprises a moonpool 8 for J-lay deployment. To allow pipe string manufacturing in parallel with J-lay pipeline deployment, the moonpool 8 is located on one side of the firing line 19. Consequently, one of the manufacturing lines 60 is routed around the moonpool 8.

Furthermore, the pipeline manufacturing lay-out shown in FIG. 2 is a vessel embedded workstation, thus located in the hull below the weather deck. To allow single- and double-joint movement between the weather deck and the pipeline manufacturing lines 60, 80, the pipe handling equipment comprises pipeline elevators 12, 14.

Figure 3:
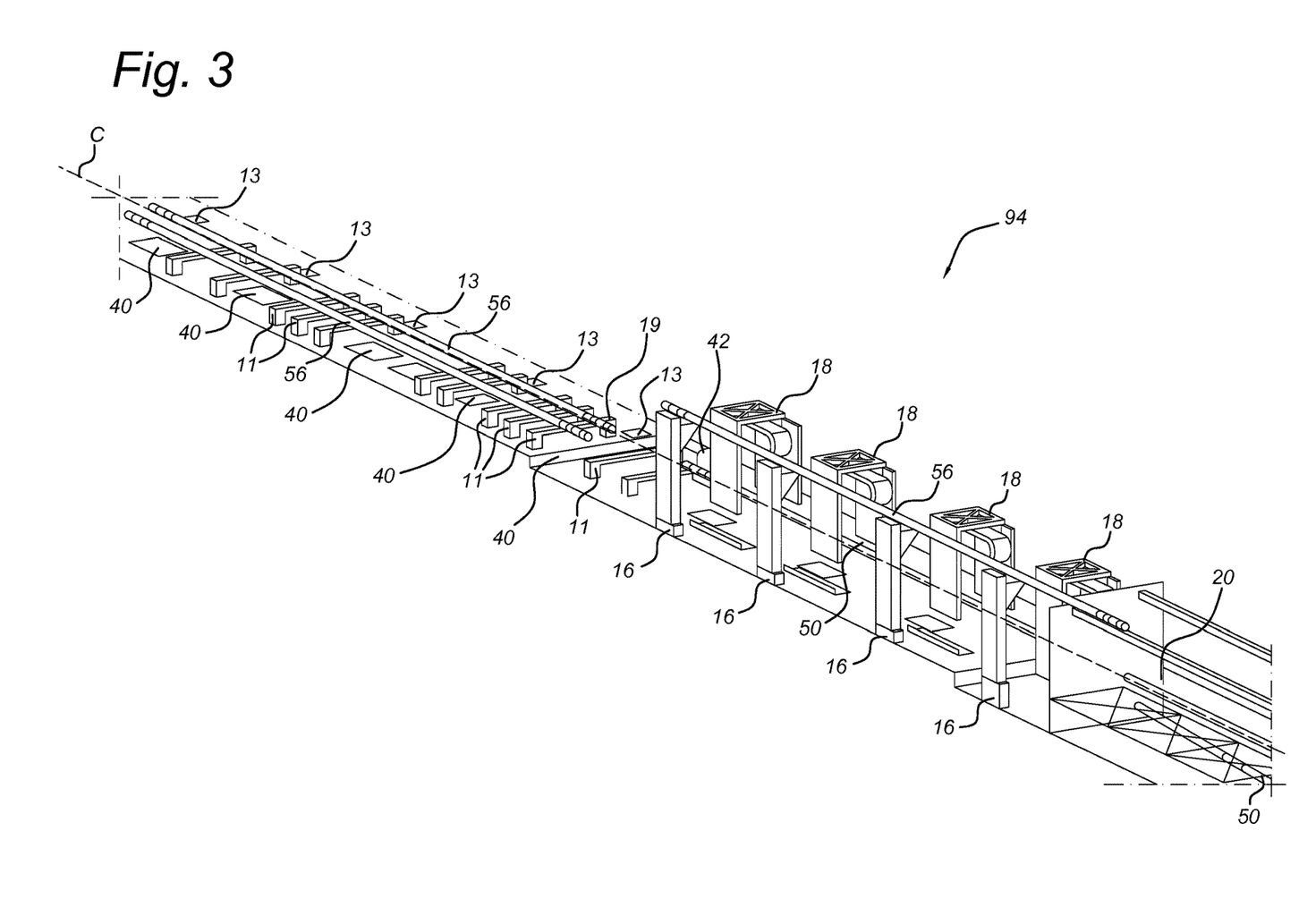
FIG. 3 shows a perspective view of the firing line with the pipe-in-pipe assembly workstation and the S-lay pipeline deployment equipment.

FIG. 3 shows a perspective view of the firing line with the pipe-in-pipe assembly workstation 94 according to an embodiment of the invention. The firing line 19 and assembly workstation 94 further comprise working areas 40, pipe handling equipment and S-lay stinger 20.

The pipe handling equipment displayed comprises longitudinal conveyors 11, transfer arms 13, elevators 16 and tensioners 18. In the configuration of this example, the pipe-in-pipe assembly workstation 94 is located on the firing line and working as pipe-in-pipe quad-joint feeding line to the S-lay stinger 20 for pipeline 50 deployment in S-lay mode. Pre-fabricated pipe-in-pipe strings are lowered from the weather deck, using the elevators 16 on the firing line to the ex-centered pipe-in-pipe insertion tooling of the pipe-in-pipe assembly workstation 94. The quad-joint pipe-in-pipe string 56 is transferred towards the bow using longitudinal conveyors 11 up to a predetermined location along the firing line 19. Then the pipe-in-pipe string 56 is transferred to the firing line 19 using transfer arms 13. The firing line comprises multiple working areas 40 with dedicated tooling along the length of the pipe. In these work areas, activities such as welding, coating and inspections take place for joining the pipe-in-pipe string 56 to the pipeline 50. The final station 42 for pipe string to pipeline joining in S-lay is located on the firing line 19, adjacent to the first tensioner 18. The tensioners 18 securely hold the end of the pipeline, ahead of the stinger 20 from which the pipeline is deployed from the vessel. It will however be understood that although S-lay operation is disclosed, the vessel will not normally lay pipe-in-pipe in S-lay mode, since such a pipeline is only usually required in deep water operations in J-lay mode.

The elevators 16 on the firing line can also be used for lifting the pipe-in-pipe strings to the weather deck, following the pipe-in-pipe string manufacturing described for FIG. 1, either for pipe storage prior to S-lay pipelay mode or for lifting into the J-lay tower for pipelay in J-lay mode.

Figure 4:
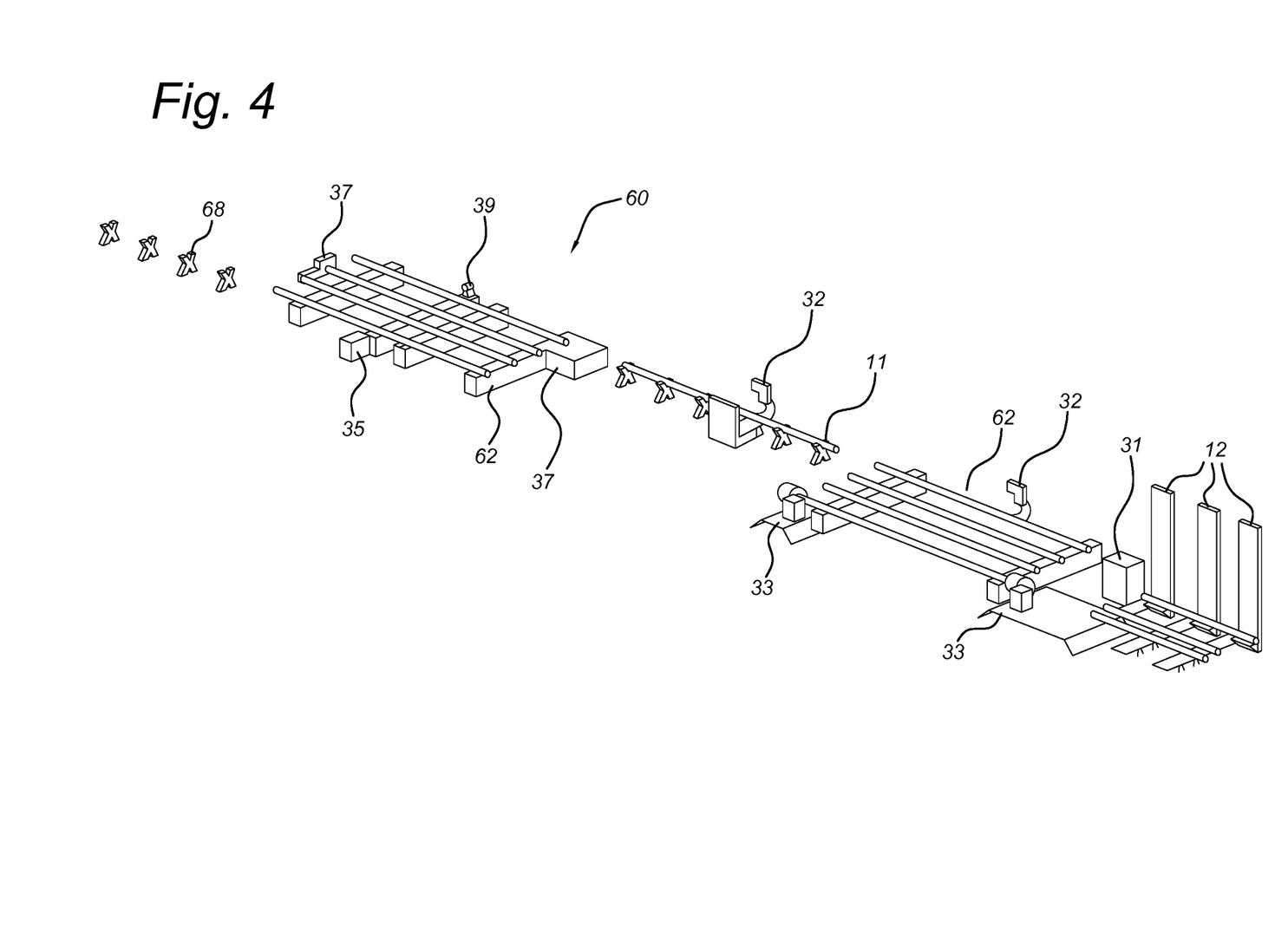
FIG. 4 shows a perspective view of part of the starboard side manufacturing line.

FIG. 4 shows a perspective view of part of the starboard side manufacturing line 60, dedicated to the outer pipe double-joint assembly. The starboard side manufacturing line 60, which is set up similarly to the portside manufacturing line, comprises single-joint elevators 12, longitudinal conveyors 11 and a double-jointing workstation 62. The double-jointing workstation has an inside diameter welding station 31, outside diameter welding stations 32, beveling stations 33, a field joint coating station 35, NDE stations 39 and pipe ends preparation stations 37. Additionally, the manufacturing line 60 includes an area 68 where the pipe-in-pipe assembly workstation can be relocated to for producing double-joint pipe-in-pipe strings, if the manufacturing lay-out is adjusted to run continuously and in parallel with pipelay in S-lay mode taking place.

Figure 5:
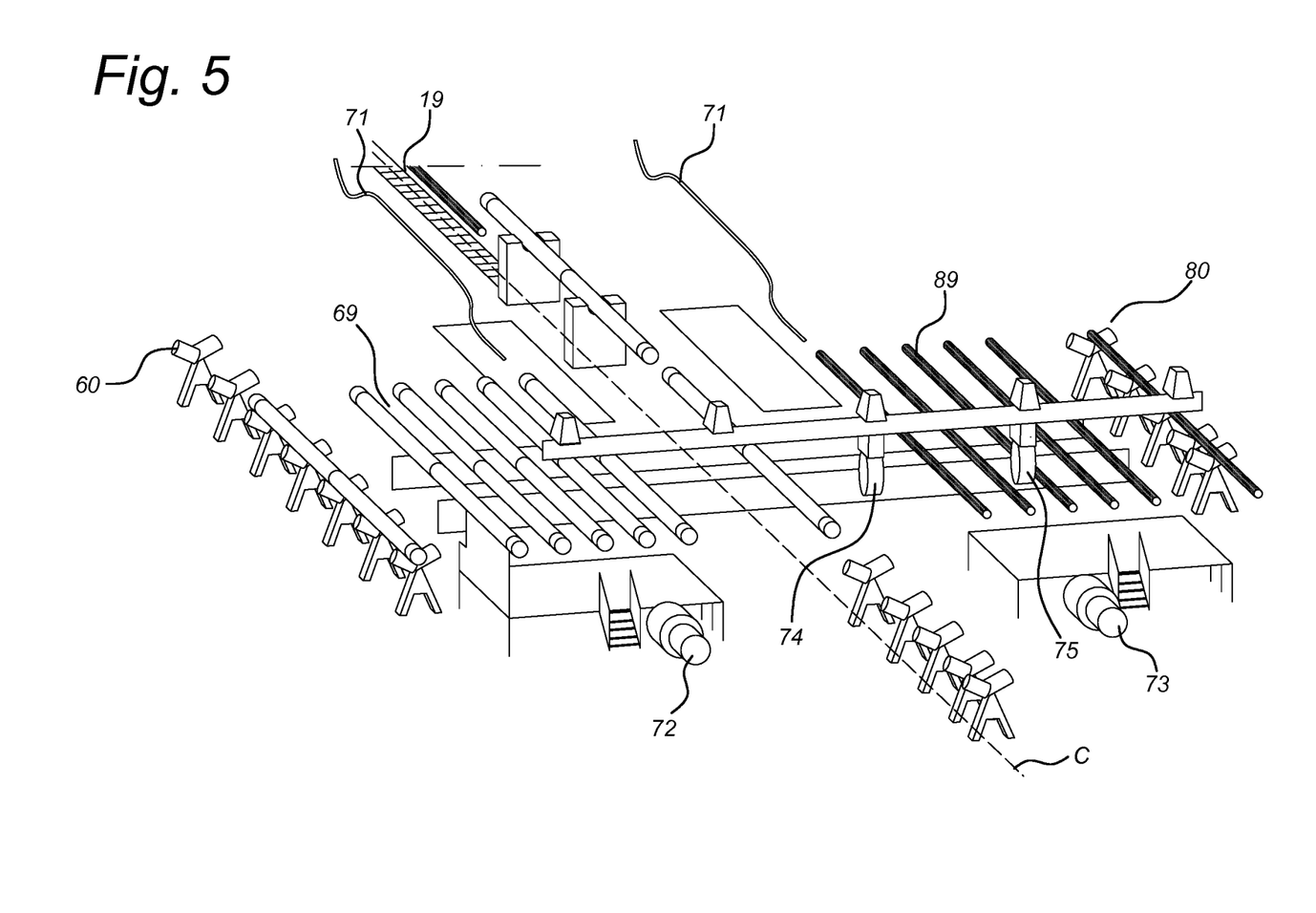
FIG. 5 shows a perspective view of the ready rack area as seen from the vessel's bow.

FIG. 5 shows a perspective view of the ready rack area as seen from the vessel's bow. The ready rack area comprises the ends of the starboard and portside manufacturing lines 60, 80 and the start of the firing line 19, located along the vessel's centerline C. The ready rack is a buffer area for the inner double-joint strings 89 and the outer double-joint strings 69 coming of the portside and starboard side manufacturing lines 80, 60 and where they are selected for assembly into triple- or quad-joint strings. All pipe handling and process equipment in the ready rack area is suitable for and arranged such that it can work on both the inner pipe and outer pipe diameters. Additionally, the ready rack area comprises two internal line-up clamp systems 74, 75 for handling outer pipe and inner pipe internal line-up clamps 72, 73 as well as a messenger line system 71. The messenger line system is used to pre-install the wire required to connect the inner and outer pipe end caps during the pipe-in-pipe assembly. One wire is pre-installed in each inner and outer double joint on the ready rack.

Figure 6:
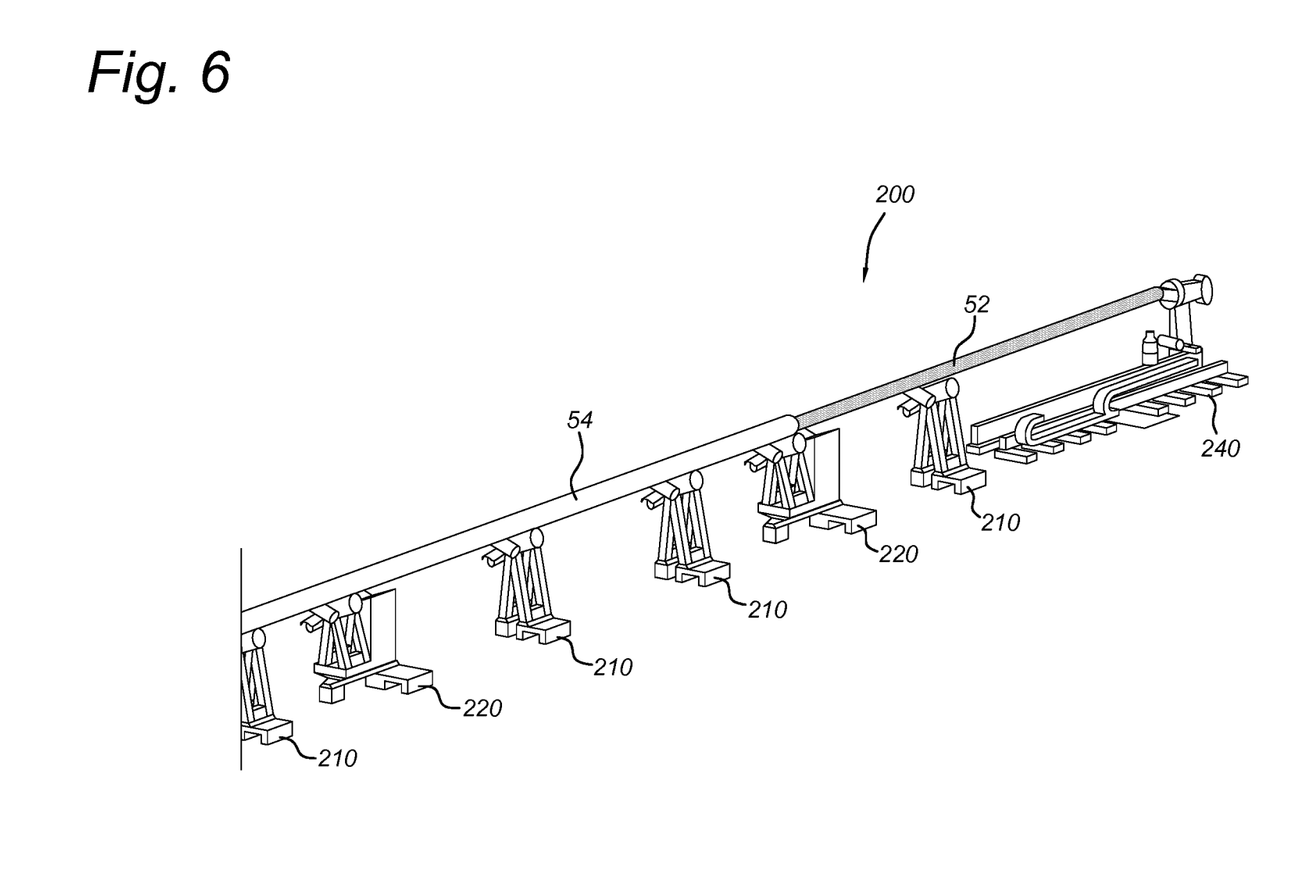
FIG. 6 shows a perspective view of the pipe-in-pipe assembly tooling of the pipe-in-pipe assembly workstation.

FIG. 6 shows a perspective view of the pipe-in-pipe assembly tooling 200 of the pipe-in-pipe assembly workstation 94. The pipe-in-pipe assembly tooling is a push-pull system 200 comprising a pipe end pusher 240 and conveyor modules 210, 220. The conveyor modules 210, 220 and pipe end pusher 240 are placed such that two pipe strings 52, 54 placed into the push-pull system 200 are aligned. The pipe end pusher 240 is positioned to the inner pipe string 52 end. A number of conveyor modules 210, 220 are distributed along the full length of the assembly workstation, whereby a first set of conveyor modules 210 are set at a fixed elevation for supporting the outer pipe string 54 during the assembly and a second set of conveyor modules 220 drives the movement of pipes. The conveyor modules 220 of the second set are described in more detail in relation to FIG. 8, while details of the pipe end pusher 240 are provided with the description of FIG. 7. The workings of the push-pull system 200 are further detailed in relation to FIG. 9 below. The push-pull system is mounted on a bolted foundation with hydraulic and electrical quick coupling connections. This foundation allows easy relocation of the system from the quad-joint assembly location on the firing line to the double-joint buffer location in the ready rack area or to the bow end of the double-joint prefabrication workstation 68, depending on pipelay project requirements. The workstation may also be used in onshore pipe-in-pipe manufacturing facilities.

Figure 7:
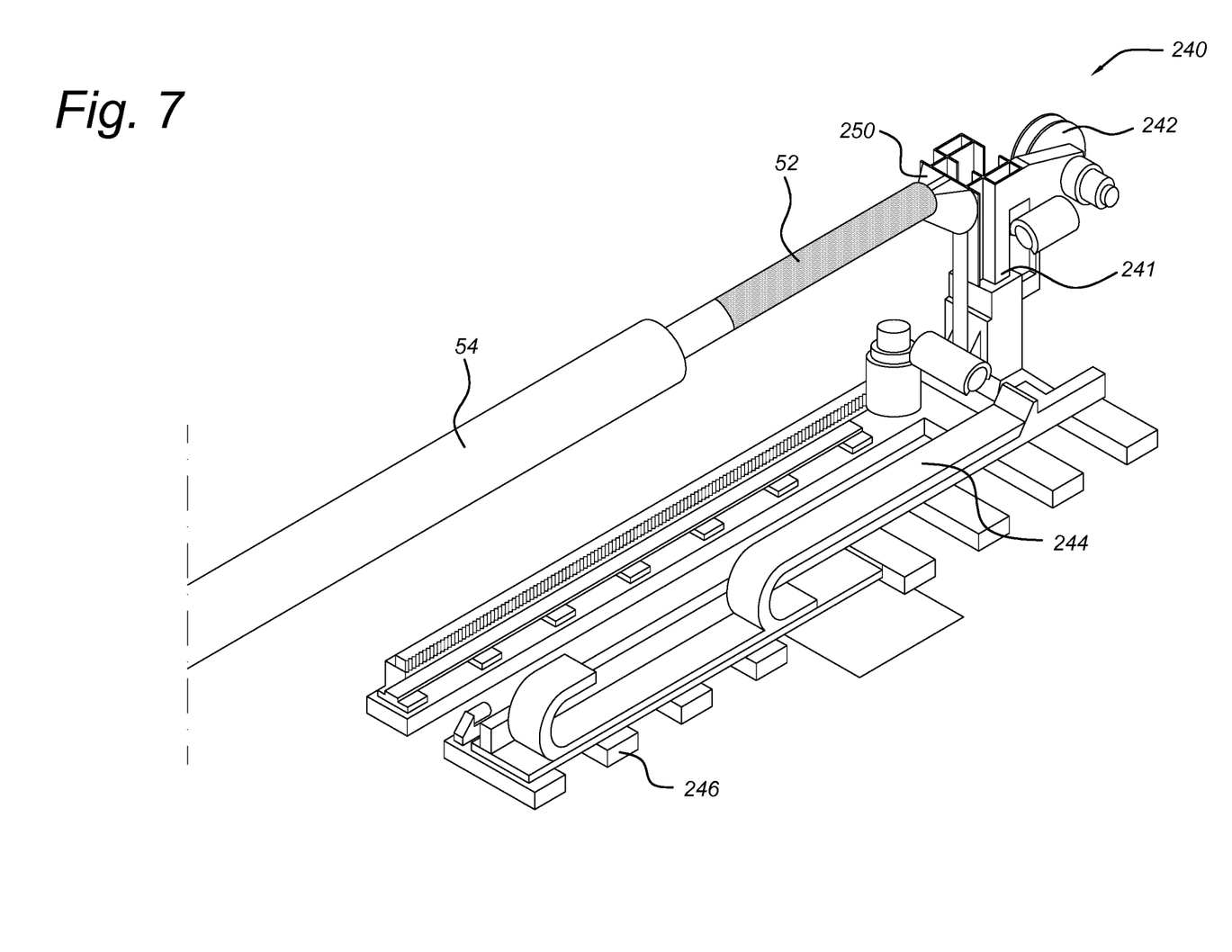
FIG. 7 provides a more detailed perspective view of the pipe end pusher of the push-pull system in the assembly workstation.

FIG. 7 provides a more detailed perspective view of the pipe end pusher 240 of the push-pull system 200 in the assembly workstation. The pipe end pusher 240 has a frame 241 with a bolted foundation 246, a longitudinal adjustment system 244, an inner pipe winch 242 and an inner pipe end cap 250. The inner pipe end cap is located at a top-side of the pipe end pusher frame 241.

The pusher frame is height adjustable, such that the height of the inner pipe end cap can be adjusted for various pipe diameters and offset requirements. The inner pipe winch 242 is located on the frame 241 at the opposite side from the end cap, such that the winch wire can be connected to the winch side of the end cap. The winch is used for tensioning the inner pipe string 52 prior to and during assembly operations, ensuring the inner pipe remains aligned and fully controlled during the operations. The pipe-in-pipe assembly with the pipe end pusher 240, including the tensioning operation, is further explained in relation to FIG. 9. The longitudinal adjustment system 244 is located at the base of the frame 241, directly above the bolted foundation 246, and is used for adjusting the pipe end pusher location in the length direction of the pipe strings 52, 54. The longitudinal adjustment system 244 enables the pipe end pusher 240 to be longitudinally adjusted over a distance of around 5 meters to compensate for the difference between the longest and shortest inner pipe-in-pipe strings 52.

Figure 8:
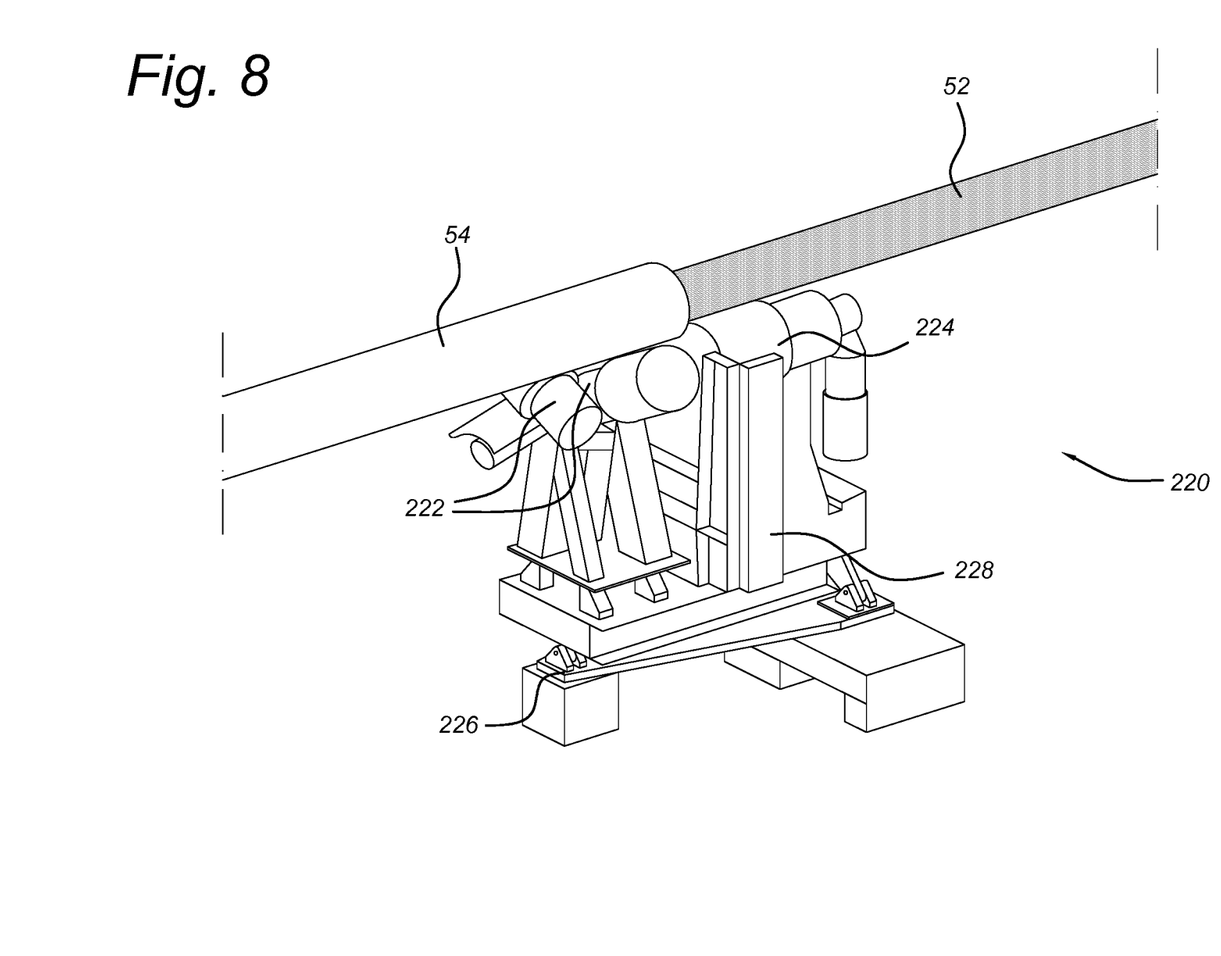
FIG. 8 gives a more detailed view of a pipe line-up conveyor module.

FIG. 8 gives a more detailed view of a motorized pipe line-up conveyor module 220. The module 220 has motorized rollers 222, 224 and a frame 228 with a bolted foundation 226. A set of motorized rollers 222 are set in a V-shape for supporting the outer pipe string 54. Another set of motorized rollers 224 is located with its rotational axis parallel to the pipe strings, and set in elevation with respect to the first two rollers, for rotating the inner pipe string 52 during pipe-in-pipe assembly. The rollers 222, 224 are height adjustable to optimize the inner to outer pipe string offset during assembly. Additionally, the parallel set of motorized rollers 224 can be moved such that they make no contact with any pipe surface, to allow the outer pipe string 54 to pass. The height of the rollers is adjustable through a hydraulic system, while the motorized rollers may have electro motors. To support a quad-joint pipe-in-pipe string during assembly, a minimum of four motorized pipe line-up conveyor modules 220 may be required.

Figure 9:
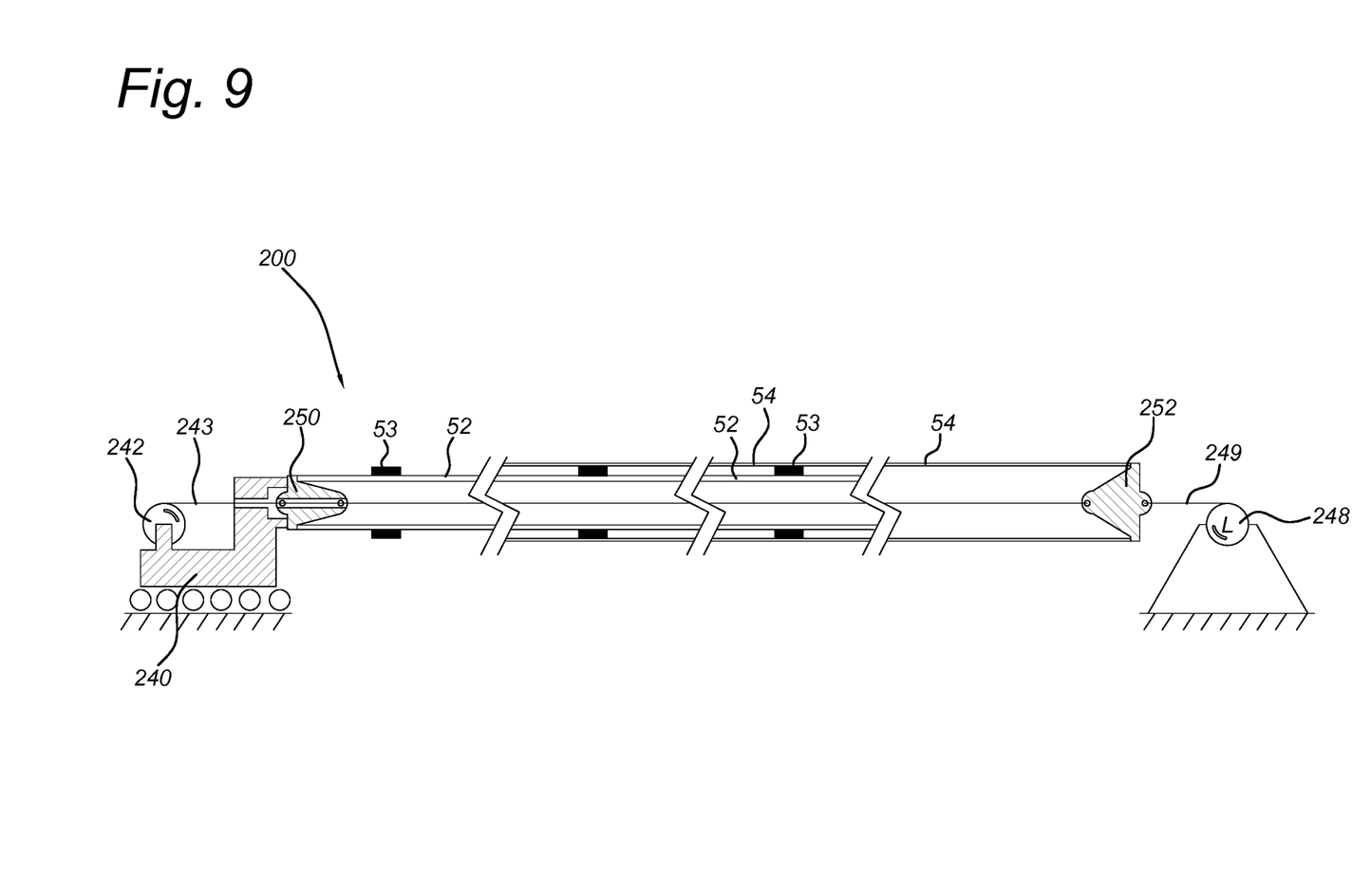
FIG. 9 shows a schematic cross-section of the pipe strings during pipe-in-pipe assembly, with pipe end pusher, end caps and winches.

FIG. 9 shows a schematic cross-section of the pipe strings in the push-pull system 200 tool during pipe-in-pipe assembly, with pipe end pusher 240, end caps 250, 252 and winches 242, 248 with winch wires 243 and 249. Inside the push-pull system 200 an inner pipe string 52 and an outer pipe string 54 have been placed for pipe-in-pipe assembly, whereby the inner pipe string has centralizers 53 located on its outer diameter. The inner pipe string 52 has the inner pipe end cap 250 placed on its first end, while its second end is inserted into the outer pipe string 54. The outer pipe string 54 has the outer pipe end cap 252 fitted to its end located farthest away from the inner pipe string 52. The inner and outer pipe end caps 250, 252 are made from soft material to ensure they do not damage the pipe ends during pipe-in-pipe assembly operations, whereby each end cap is a tailor-made tool machined to fit a specific pipe string end diameter size. The pipe end pusher 240 is equipped with an inner pipe end cap 250. The inner pipe end cap 250 is provided with a passage by which a wire 243 of the inner pipe winch 242, can pass through both the inner pipe string 52 and the outer pipe string 54 and connect to the inner side of the outer pipe end cap 252. The external facing side of the outer pipe end cap 252 is connected at a second side of the workstation, normally the stern side, to an outer pipe winch 248. Operators of the system ensure the installation of the end cap system and adjust the pipe end pusher 240 to the inner pipe end string in elevation and transversal position. The insertion is initiated with a combination of the motorized rollers 224 described for FIG. 8 and the winch system. The initiation of insertion is completed when a minimum pressure is applied to the pipe end by the pipe pusher 240. At this stage, the operator switches the winch system from the controlled tension mode to a constant tension mode and the insertion is performed using only the motorized rollers 224 supporting the outer pipe string. The pipe-in-pipe centralizers 53, which have been preinstalled onto the inner pipe string 52 prior to pipe-in-pipe assembly assure a constant gap between the inner pipe string 52 and the outer pipe string 54.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims.

The invention claimed is:

1. A pipelay vessel, comprising two pipe string manufacturing lines and a firing line, wherein the pipe string manufacturing lines are designed for simultaneously handling two different pipe outer diameters for use as an inner pipe and an outer pipe respectively and each comprise one or more workstations for the fabrication of multi-length strings from single joints, wherein the vessel further comprises a pipe-in-pipe assembly workstation for assembling the inner pipe and the outer pipe in a pipe-in-pipe configuration, and wherein the pipe-in-pipe assembly station is arranged to assemble inner and outer pipe strings on the firing line or parallel and adjacent to the firing line, such that a distance between the firing line and the pipe-in-pipe assembly station is less than 5 meters.

2. The vessel according to claim 1, wherein the pipe-in-pipe assembly station is configured for the assembly of pipe-in-pipe lengths with a string length ranging between one and up to four standard joint lengths.

3. The vessel according to claim 1, the vessel further comprising storage space for single pipe joints.

4. The vessel according to claim 1, the vessel further comprising:
   a) a weather deck;
   b) a J-lay pipe deployment facility comprising a tower arranged above the weather deck, for deployment of pipe in J-lay mode, received from the firing line;
   c) pipe handling equipment for delivering the pipe or pipe-in-pipe strings from the firing line to the tower.

5. The vessel according to claim 4, the vessel further comprising a moonpool, passing through the weather deck, and wherein the J-lay tower is located above the moonpool.

6. The vessel according to claim 4, the vessel further comprising an S-lay pipe deployment facility located below the weather deck, comprising the firing line.

7. The vessel according to claim 6, wherein the J-lay tower is arranged for performing operations through the moonpool simultaneously with operation of the S-lay pipe deployment facility to manufacture the pipeline.

8. The vessel according to claim 6, wherein the firing line extends along a centreline of the vessel and wherein the moonpool is located to one side of the firing line.

9. The vessel according to claim 6, wherein the moonpool is separated from the firing line by a cofferdam extending to the weather deck.

10. The vessel according to claim 6, wherein the pipe handling equipment comprises an elevator arranged to elevate pipe-in-pipe strings from the firing line to the weather deck.

11. The vessel according to claim 1, the vessel further comprising on-board storage for the fabricated pipe-in-pipe strings.

12. The vessel according to claim 1, the vessel being arranged with the pipe string manufacturing lines below the weather deck.

13. A method of laying a pipe-in-pipe pipeline from a pipe-laying vessel having two independent and separate pipe string manufacturing lines, a firing line and a J-lay tower, the method comprising deploying pipe from the vessel in J-lay mode by:
  a) introducing single pipe in a first workstation of each of the two pipe string manufacturing lines, whereby the first pipe string manufacturing line receives inner pipes and the second pipe string manufacturing line receives outer pipes, the inner pipes having a smaller outer diameter than the inner diameter of the outer pipes;
  b) fabricating double-joints in a first type workstation of each pipe string manufacturing line;
  c) introducing the double-joints into the firing line;
  d) joining doubles to form quad- or triple-joint pipe strings on the firing line;
  e) assembling the inner pipe and the outer pipe strings in a pipe-in-pipe configuration;
  f) presenting the pipe-in-pipe configuration to the J-lay tower; and
  g) connecting the pipe-in-pipe configuration to the pipeline and lowering the pipeline into a sea.

14. The method according to claim 13, wherein step e) at least in part is performed on the firing line.

15. The method according to claim 13, wherein the J-lay tower is located adjacent to a moonpool and wherein the pipe-in-pipe pipeline is lowered through the moonpool.

16. The method according to claim 13, wherein the steps a) to e) are performed below a weather deck and wherein the J-lay tower is located above the weather deck, the step f) further comprising elevating the pipe-in-pipe configuration to the weather deck.

17. The method of claim 13,
  wherein the vessel comprises two pipe string manufacturing lines and a firing line,
  wherein the pipe string manufacturing lines are designed for simultaneously handling two different pipe outer diameters for use as an inner pipe and an outer pipe respectively,
  wherein the vessel further comprises a pipe-in-pipe assembly workstation for assembling the inner pipe and the outer pipe in a pipe-in-pipe configuration,
  wherein the vessel further comprises:
    a) a weather deck;
    b) a J-lay pipe deployment facility comprising a tower arranged above the weather deck, for deployment of pipe in J-lay mode, received from the firing line;
    c) pipe handling equipment for delivering the pipe or pipe-in-pipe strings from the firing line to the tower.

18. The method according to claim 13, the method further comprising subsequent or prior to deploying pipe in J-lay mode, abandoning and recovering the pipeline and performing S-lay deployment of pipe over a stern of the vessel,
  wherein the vessel comprises two pipe string manufacturing lines and a firing line,
  wherein the pipe string manufacturing lines are designed for simultaneously handling two different pipe outer diameters for use as an inner pipe and an outer pipe respectively,
  wherein the vessel further comprises a pipe-in-pipe assembly workstation for assembling the inner pipe and the outer pipe in a pipe-in-pipe configuration,
  wherein the vessel further comprises:
    a) a weather deck;
    b) a J-lay pipe deployment facility comprising a tower arranged above the weather deck, for deployment of pipe in J-lay mode, received from the firing line;
    c) pipe handling equipment for delivering the pipe or pipe-in-pipe strings from the firing line to the tower, and
  wherein the vessel further comprises an S-lay pipe deployment facility located below the weather deck, comprising the firing line.

* * * * *